(12) United States Patent
Steinberg et al.

(10) Patent No.: US 9,143,793 B2
(45) Date of Patent: Sep. 22, 2015

(54) VIDEO PROCESSING SYSTEM, COMPUTER PROGRAM PRODUCT AND METHOD FOR MANAGING A TRANSFER OF INFORMATION BETWEEN A MEMORY UNIT AND A DECODER

(75) Inventors: Erez Steinberg, Tel Aviv (IL); Moshe Nakash, Or Yehuda (IL); Yehuda Yitschak, Magen Shaul (IL)

(73) Assignee: Freescale Semiconductor, Inc., Austin, TX (US)

( * ) Notice: Subject to any disclaimer, the term of this patent is extended or adjusted under 35 U.S.C. 154(b) by 858 days.

(21) Appl. No.: 12/788,386

(22) Filed: May 27, 2010

(65) Prior Publication Data

US 2011/0293009 A1    Dec. 1, 2011

(51) Int. Cl.
*H04N 7/28* (2006.01)
*H04N 7/50* (2006.01)
*H04N 19/423* (2014.01)
*H04N 19/46* (2014.01)
*H04N 19/51* (2014.01)
(Continued)

(52) U.S. Cl.
CPC .............. *H04N 19/423* (2014.11); *H04N 19/44* (2014.11); *H04N 19/46* (2014.11); *H04N 19/51* (2014.11); *H04N 19/513* (2014.11); *H04N 19/60* (2014.11)

(58) Field of Classification Search
CPC .......... H04N 5/144; H04N 7/03; H04N 7/28; H04N 7/30; G06K 9/002; G06F 17/14
USPC ............... 375/240.11, 240.13, 240.16, 240.2, 375/240.1, 240.08, 240.12, 240.6; 348/222.1; 725/81
See application file for complete search history.

(56) References Cited

U.S. PATENT DOCUMENTS 6,275,531 B1 *   8/2001   Li .............................. 375/240.12
6,529,554 B1     3/2003   Craver
(Continued)

FOREIGN PATENT DOCUMENTS

WO      2011005105 A1     1/2011

OTHER PUBLICATIONS

European Search Report mailed Aug. 3, 2011 in Application EP11167377.8-2223.
(Continued)

*Primary Examiner* — Y Lee
*Assistant Examiner* — Salame Amr

(57) ABSTRACT

Video processing system, computer program product and method for managing an exchange of information between a memory unit and a decoder, the method includes: (a) retrieving, from the memory unit, a first non-zero data structure that comprises only non-zero first transform coefficient groups; wherein first transform coefficient groups are associated with a first quality level; (b) retrieving, from the memory unit, second layer information; (c) processing, by the video decoder, the second layer information and the first non-zero data structure to provide second transform coefficient groups; (c) generating, by the video decoder, a second non-zero data structure that comprises only non-zero second transform coefficient groups; wherein the second non-zero data structure is associated with a second quality level that is higher than the first quality level; (d) generating second non-zero indicators that are indicative of non-zero transform coefficient groups, wherein the second non-zero data structure is associated with a second quality level that is higher than the first quality level; and (e) writing to the memory unit the second non-zero indicators.

19 Claims, 5 Drawing Sheets

(51) Int. Cl.
*H04N 19/513* (2014.01)
*H04N 19/60* (2014.01)
*H04N 19/44* (2014.01)

(56) References Cited

U.S. PATENT DOCUMENTS

| | | | |
|---|---|---|---|
| 7,472,151 B2 | 12/2008 | Schumann | |
| 7,525,456 B2 | 4/2009 | Watanabe | |
| 7,535,387 B1 | 5/2009 | Delva | |
| 2003/0156652 A1* | 8/2003 | Wise et al. | 375/240.26 |
| 2004/0028131 A1* | 2/2004 | Ye et al. | 375/240.11 |
| 2004/0240559 A1 | 12/2004 | Prakasam et al. | |
| 2005/0046702 A1* | 3/2005 | Katayama et al. | 348/222.1 |
| 2005/0259747 A1 | 11/2005 | Schumann | |
| 2006/0078049 A1* | 4/2006 | Bao et al. | 375/240.11 |
| 2006/0095943 A1* | 5/2006 | Demircin et al. | 725/81 |
| 2006/0153294 A1* | 7/2006 | Wang et al. | 375/240.08 |
| 2006/0165181 A1* | 7/2006 | Kwan et al. | 375/240.24 |
| 2006/0171463 A1* | 8/2006 | Hanamura et al. | 375/240.13 |
| 2007/0025447 A1* | 2/2007 | Kojokaro et al. | 375/240.24 |
| 2007/0040711 A1 | 2/2007 | Ziauddin | |
| 2008/0013622 A1* | 1/2008 | Bao et al. | 375/240.1 |
| 2008/0046698 A1 | 2/2008 | Ahuja et al. | |
| 2008/0144723 A1* | 6/2008 | Chen et al. | 375/240.26 |
| 2008/0317378 A1* | 12/2008 | Steinberg et al. | 382/275 |
| 2009/0122867 A1* | 5/2009 | Mauchly et al. | 375/240.16 |
| 2009/0225844 A1 | 9/2009 | Winger | |
| 2010/0020874 A1 | 1/2010 | Shin et al. | |
| 2010/0290520 A1* | 11/2010 | Kamisli et al. | 375/240.2 |
| 2011/0080945 A1* | 4/2011 | Thang et al. | 375/240.02 |
| 2011/0080947 A1* | 4/2011 | Chen et al. | 375/240.12 |

OTHER PUBLICATIONS

Heiko Schwartz, Detlev Marpe, "Overview of the scalable video coding extension of the H.264/AVC standard". IEEE Transactions on circuits and systems for video technology, vol. 17, No. 9, Sep. 2007.
Detlev Marpe, Heiko Schwartz, "Context-Based Adaptive Binary Arithmetic Coding in the H.264/AVC Video Compression Standard". IEEE Transactions on circuits and systems for video technology, vol. 13, No. 7, Jul. 2003.

* cited by examiner

| A | 0 | 0 | C |
|---|---|---|---|
| B | 0 | 0 | 0 |
| D | E | 0 | 0 |
| F | G | 0 | 0 |

| 0 | H | 0 | 0 |
|---|---|---|---|
| 0 | 0 | 0 | I |

◀— TC(1,1) 111

| 0 | J | 0 | 0 |
|---|---|---|---|
| K | L | 0 | 0 |
| 0 | 0 | 0 | 0 |
| 0 | 0 | 0 | 0 |

421(1)- 421(16)

421(17)- 421(24)

| 0 | 0 | 0 | 0 |
|---|---|---|---|
| 0 | 0 | M | N |

◀— TCI(2,1) 421

| A | J | 0 | C |
|---|---|---|---|
| B+K | L | 0 | 0 |
| D | E | 0 | 0 |
| F | G | 0 | 0 |

121(1)- 121(16)

121(17)- 121(24)

| 0 | H | 0 | 0 |
|---|---|---|---|
| 0 | 0 | M | N+I |

◀— TC(2,1) 121

II(1,1) 521
| 1 | 1 | 0 | 0 | 0 | 0 | 0 | 0 | 0 | 0 | 0 | 0 | 0 | 0 | 0 | 0 | 0 | 0 | 0 | 0 | 1 | 1 | 1 | 0 |

| 1 | 1 | 0 | 0 | 0 | 0 | 0 | 0 | 0 | 0 | 0 | 0 | 1 | 1 | 1 | 1 | 0 | 0 | 1 | 0 | 1 | 1 | 1 | 1 |

I(1,1) 221

| A | J | B+K | L | C | D | E | F | G | H | M | N+I |

NZD(2,1) 321

FIG. 2

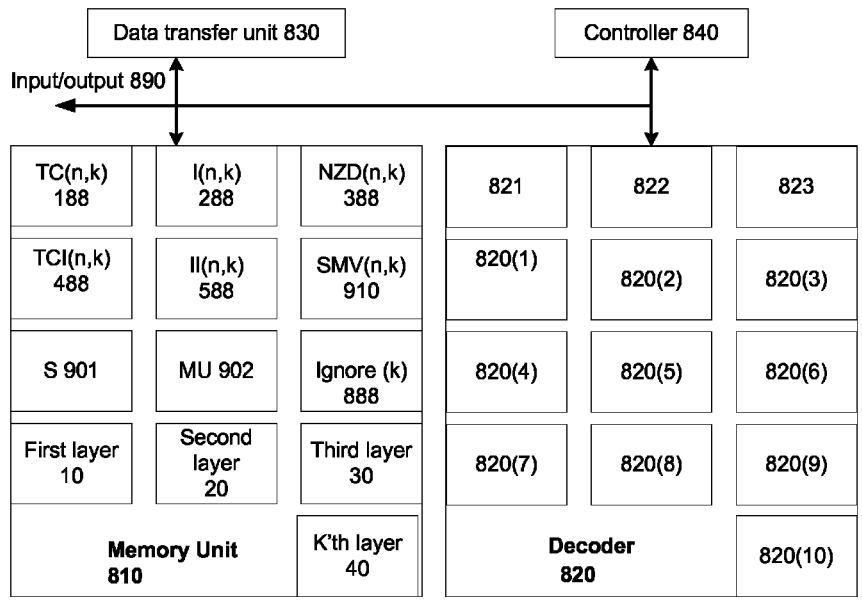

821 Second transform coefficient groups generator
822 Second non-zero data structure generator
823 Second non-zero indicators generator
820(1) First layer processor
820(2) Motion vector extractor
820(3) Decoder controller
820(4) Single motion vector indicator generator
820(5) First layer non-zero data structure generator
820(6) First layer non-zero identifier generator
820(7) Transform coefficient group generator
820(8) Intermediate set generator
820(9) Reconstruction module
820(10) Merge unit

FIG. 5

VIDEO PROCESSING SYSTEM, COMPUTER PROGRAM PRODUCT AND METHOD FOR MANAGING A TRANSFER OF INFORMATION BETWEEN A MEMORY UNIT AND A DECODER

FIELD OF THE INVENTION

This invention relates to a video processing system, a computer program product and a method for managing a transfer of information between a memory unit and a decoder.

BACKGROUND OF THE INVENTION

The Scalable Video Coding (SVC) amendment to the H.264 recommendation (H.264 SVC) of ITU-T describes a scalable video stream decoder which is used to decode a subset of a bit stream in order to adapt it to the various needs or preferences of end users as well as to varying terminal capabilities or network conditions.

The SVC bit stream includes different layers of encoded video. Each layer includes a large number of images, and each image includes multiple slices that in turn are partitioned to macroblocks. The base layer is referred to as a first layer and is a valid H.264 AVC video stream. Additional layers are referred to as enhancement layer and provide higher quality or resolution levels or higher frame rates. Allowable sizes of a macroblock are defined in the H.264 SVC. For example, a macroblock may include 16×16 Luma samples and 16×8 Chroma samples. Such a macroblock is encoded to provide AN encoded macroblock.

The decoding process includes multiple stages. It may include receiving a bit stream, performing entropy decoding, up-sampling and de-blocking, as well as other operations. The entropy decoding may include generating transform coefficients and then using the transform coefficients to reconstruct images. These transform coefficients are also referred to as residuals because they represent a difference between currently decoded information and previously decoded information.

For example, the encoded macroblock is decoded to provide a macroblock. During the decoding process an encoded macroblock is converted (during an encoding process) to 16×16 Luma transform coefficients and 16×8 Chroma coefficients, arranged in 4×4 Luma transform coefficient groups and 4×2 Chroma transform coefficient groups. Each of these transform coefficient groups has its own motion vector (not shown). Each transform coefficient may be 2 bytes long.

The decoding process of a scalable video includes a large number of accesses to a memory unit, as the amount of information per each video image may exceed 2 Mega Bits.

These accesses are time and resource consuming, especially when the information is stored in a memory unit that is not an integral part of the decoder integrated circuit.

SUMMARY OF THE INVENTION

The present invention provides a video processing system, a computer program product and a method for managing a transfer of information between a memory unit and a decoder as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 2 schematically shows an example of an embodiment of data structures;

FIG. 5 schematically shows an example of an embodiment of a video processing system.

DETAILED DESCRIPTION OF THE PREFERRED EMBODIMENTS

Figure 1:
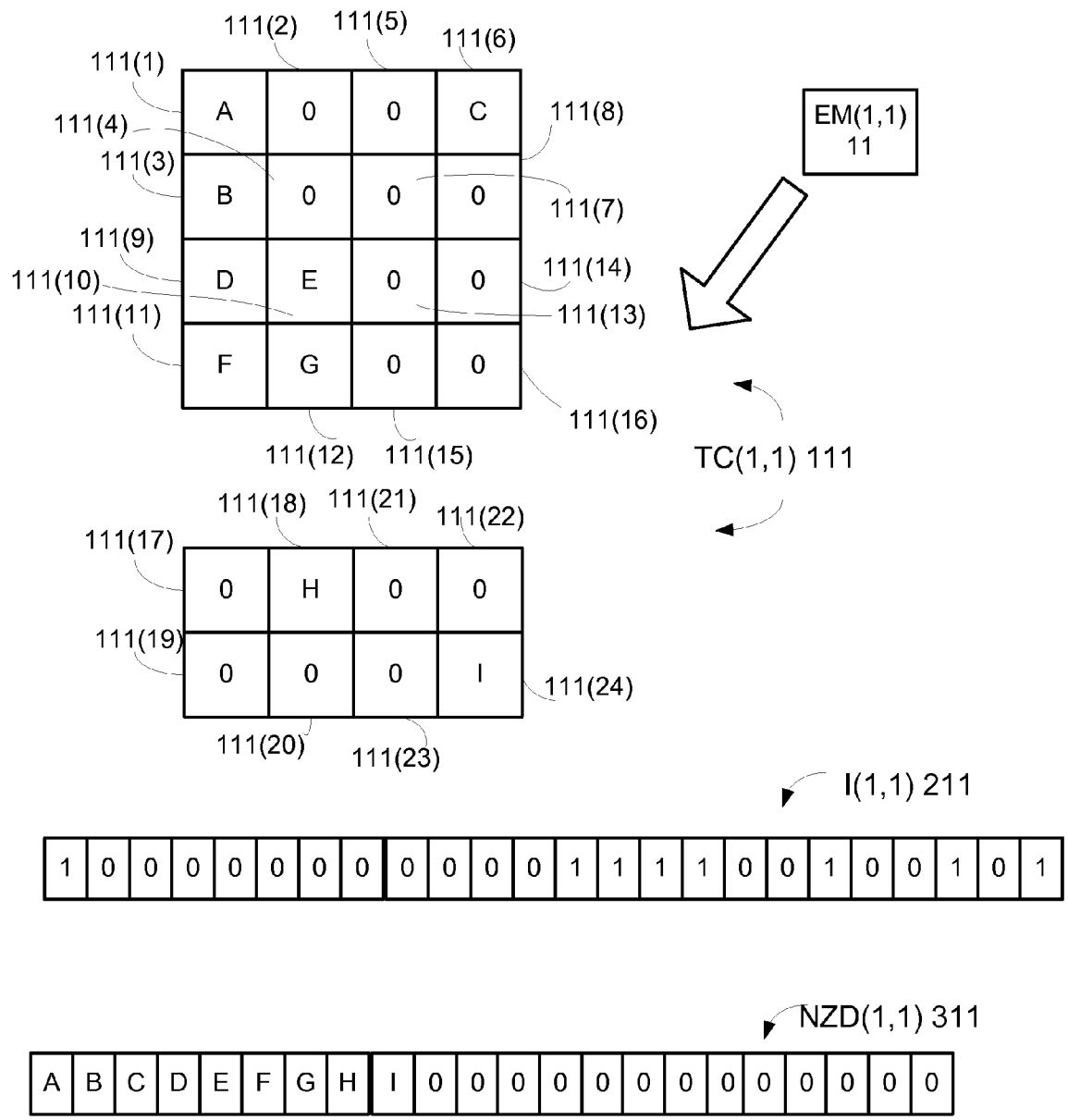
FIG. 1 schematically shows an example of an embodiment of data structures.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

A video stream may be decoded in various manners and be transmitted over different communication links or stored in different memory units. In order to provide a good trade-off between quality requirements and bandwidth of storage requirements scalable decoding and encoding schemes were developed. Quality scalable decoding includes decoding a base layer (first layer) and multiple enhancement layers (second layer, third layer . . . K'th layer) to provide a decoded video stream of a desired quality level. The first layer provides video with the lowest quality level and each enhancement layer can be made to provide a higher quality level.

Quality scalable decoding may include a large number of transfer operations between a memory unit and a decoder.

A scalable quality decoding process may include decoding only the base layer or decoding the base layer and one or more enhancement layers.

The decoding and encoding processes are usually applied on fractions of an image that are known as macroblocks. Each of the base layer and enhancement layer includes multiple macroblocks.

In the following explanation a macroblock based scheme is provided in which using a macroblock as an example of a type of a subset of a video layer, however, those of skill in the art will appreciate that the methods, systems and computer program product may be applied mutatis mutandis on other types of subsets of a video layer.

The time allocated for transfer of information between a decoder and a memory unit can be reduced by generating compact data structures and transferring compact data structures between the memory unit and the decoder.

Each layer of a scalable video stream is represented by multiple compact data structures. A decoding process of an entire video stream (with all its layers) includes multiple repetitions of compact data structure fetch, update and write operations. The compactness of the data structures may also assist in increasing the success of pre-fetch operations (speculative fetch operations) thus further reducing the traffic between the decoder and the memory unit.

The decoding process starts by entropy decoding of encoded macroblocks of a first layer to generate sets of transform coefficients groups. Compact data structures that represent the transform coefficients of first layer macroblock can be sent back to the memory unit and be retrieved when a corresponding encoded macroblock of a second layer is being decoded.

If more than a single enhancement layer exists the decoding process may proceed by repetitively fetching data structures representing a currently decoded enhancement layer and data structures representing one or more previous enhancement layers. The decoding process may end when a target quality level is achieved and the layer corresponding to the target quality level is decoded.

The decoding process includes generating and exchanging compact data structures such as: (i) a non-zero data structure that includes non-zero transform coefficient groups and does not include zero value transform coefficient groups, and (ii) non-zero indicators that are indicative of non-zero transform coefficient groups.

These compact data structures facilitate a reconstruction of all the transform coefficients of a macroblock and are usually much smaller than the set of transform coefficient groups.

FIG. 1 schematically shows an example of an embodiment for a first layer with a first layer first set of transfer coefficient groups TC(1,1) 111 that includes Luma transfer coefficients and Chroma transfer coefficients.

Figure 4:
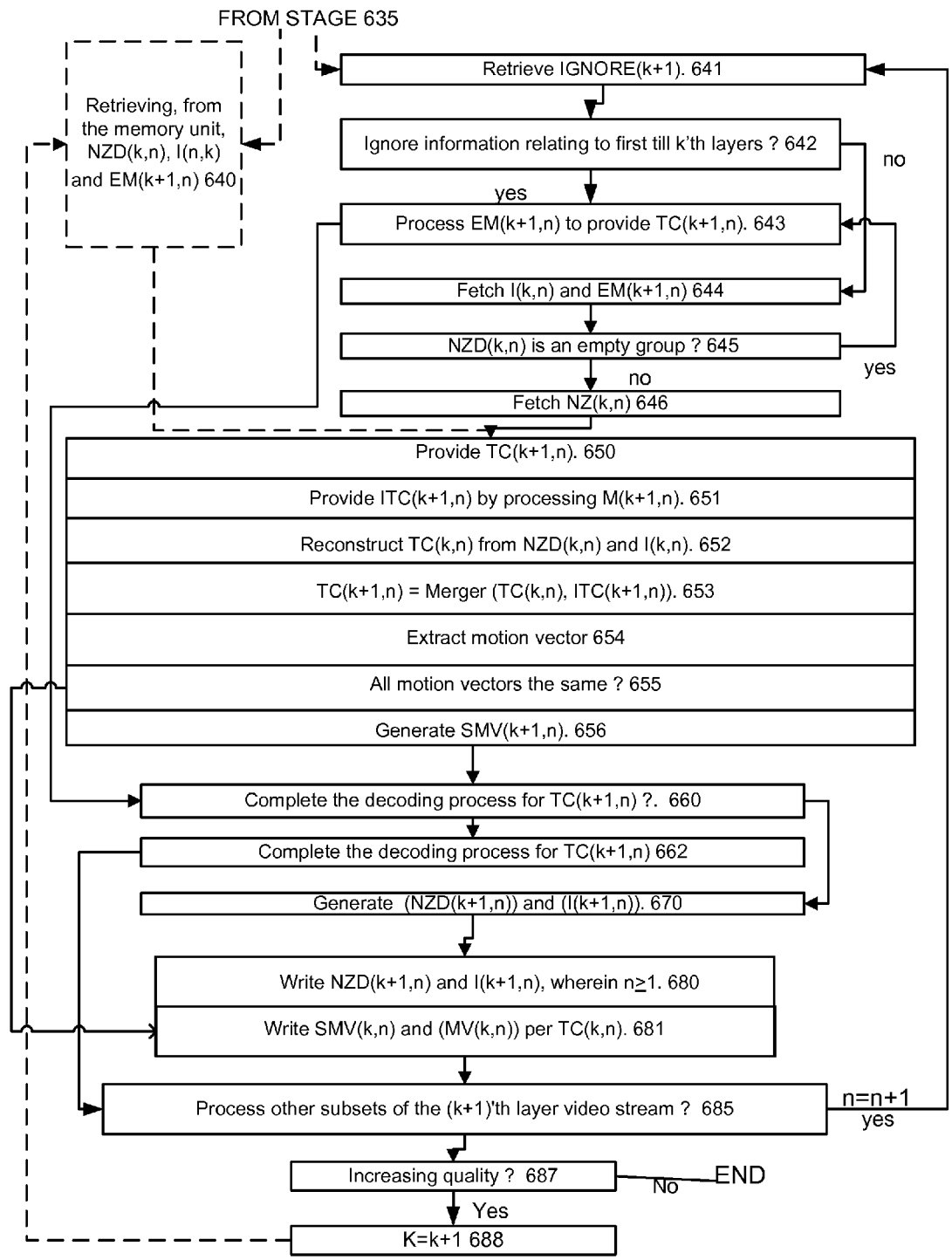

TC(1,1) 111 represent a first encoded macroblock EM(1,1) 11 of first layer (denoted 10 in FIG. 4). This first layer may be a base layer of a lowest quality level.

TC(1,1) 111 includes first layer first set (FLFS) transfer coefficient groups. In the example twenty four groups are shown, however depending on the specific encoding scheme another number of groups may be used. The shown groups start by sixteen FLFS Luma transfer coefficient groups that are followed by eight FLFS Chroma transfer coefficient groups.

The FLFS Luma transfer coefficient groups include 4×4 FLFS Luma transfer coefficients groups 111(1)-111(16), each including 4 FLFS Luma transfer coefficients. The first, third, sixth, ninth, tenth, eleventh and twelfth FLFS transfer coefficient groups (111(1), 111(3), 111(6), 111(9), 120(10), 111(11) and 111(12)) are non-zero FLFS Luma transfer coefficient groups while the other FLFS Luma transfer coefficient groups (111(2), 111(4), 111(5), 111(7), 111(8), 111(13), 111(14), 111(15) and 111(16)) are zero value FLFS Luma transfer coefficient groups.

The FLFS Chroma transfer coefficient groups include 4×2 FLFS Chroma transfer coefficients groups 111(17)-111(24), each including 4 FLFS Chroma transfer coefficients. The nineteenth and twenty fourth FLFS transfer coefficient groups (111(18) and 111(24)) are non-zero Chroma transfer coefficient groups while the other Chroma transfer coefficient groups (111(17), 111(19), 111(20), 111(21), 120(22), and 111(23)) are zero value Chroma transfer coefficient groups.

A decoder generates TC(1,1) 111 during the entropy decoding process. Instead of sending the entire TC(1,1) 111 to a memory unit, the decoder generates compact data structures that are sent to the memory unit and are retrieved when a corresponding encoded macroblock of the second layer is decoded. FIG. 1 illustrates two compact data structures 211 and 311 that represent TC(1,1) 111.

These compact data structures include FLFS non-zero indicators I(1,1) 211 and FLFS non-zero data structure NZD (1,1) 311.

I(1,1) 211 indicate which transfer coefficients groups of TC(1,1) 111 are non-zero. Each set bit of I(1,1) 211 is indicative of a non-zero FLFS transfer coefficient group. FIG. 1 illustrates a bit map that indicates that the first, third, sixth, ninth, tenth, eleventh, twelfth, nineteenth and twenty fourth FLFS transfer coefficient groups of TC(1,1) 111 are non-zero FLFS transfer coefficient groups while other FLFS transfer coefficient groups are zero value FLFS transfer coefficient groups.

NZD(1,1) 311 includes an ordered sequence of the non-zero FLFS transfer coefficient groups—111(1), 111(3), 111 (6), 111(9), 120(10), 111(11), 111(12), 111(18) and 111(24), as represented in FIG. 1 by the letters A-I. It does not include the zero value first layer first macroblock transfer coefficient groups. Thus, less data needs to be sent.

FIG. 2 schematically shows a second example of an embodiment for a second layer of a higher quality level than the first layer of FIG. 1 with a second layer first set (SLFS) of intermediate transfer coefficient groups TCI(2,1) 421, of SLFS transfer coefficient group TC(2,1) 121, of two compact data structures 221 and 321 that represent a SLFS transfer coefficient groups set TC(2,1) 121, and of SLFS intermediate non-zero indicators II(2,1) 521.

Encoded macroblock EM(2,1) 21 is processed to provide TCI(2,1) 421.

TCI(2,1) 421, I(1,1) 211 and NZD(1,1) 311 are processed to provide TC(2,1) 121. The decoder adds or otherwise merges TC(1,1) 111 and TCI(2,1) 421 to provide TC(2,1) 121.

TC(2,1) 121 is processed to provide I(2,1) 221 and NZD (2,1) 321.

TCI(2,1) 421 includes twenty four SLFS intermediate transfer coefficient groups, starting by sixteen SLFS intermediate Luma transfer coefficient groups that are followed by eight SLFS intermediate Chroma transfer coefficient groups. Although, again, it will be appeared that other numbers might be used.

The SLFS intermediate Luma transfer coefficient groups 121 include 4×4 SLFS intermediate Luma transfer coefficients groups 121(1)-121(16), each including four SLFS intermediate Luma transfer coefficients. The second, third and fourth SLFS intermediate transfer coefficient groups 121 (2), 121(3) and 121(4) are non-zero SLFS intermediate Luma transfer coefficient groups while the other SLFS intermediate Luma transfer coefficient groups (121(1), and 121(5)-121 (16)) are zero value SLFS intermediate Luma transfer coefficient groups.

The SLFS intermediate Chroma transfer coefficients 312 include 4×2 SLFS intermediate Chroma transfer coefficients groups 121(17)-121(24), each including four SLFS intermediate Chroma transfer coefficients. The twenty third and twenty fourth SLFS intermediate transfer coefficient groups (121(23) and 121(24)) are non-zero SLFS intermediate Chroma transfer coefficient groups while the other SLFS intermediate Chroma transfer coefficient groups (121(17)-121(21)) are zero value SLFS Chroma transfer coefficient groups.

TC(2,1) 121 includes twenty four SLFS transfer coefficient groups, starting by sixteen SLFS Luma transfer coefficient groups that are followed by eight SLFS Chroma transfer coefficient groups.

The second SLFS Luma transfer coefficient groups include 4×4 SLFS Luma transfer coefficients groups 121(1)-121(16), each including four SLFS Luma transfer coefficients. The first, second, third, fourth, sixth, ninth, tenth, eleventh and twelfth SLFS transfer coefficient groups (121(1), 121(2), 121 (3), 121(4), 121(6), 121(9), 121(10), 121(11) and 121(12)) are non-zero SLFS Luma transfer coefficient groups while the other SLFS Luma transfer coefficient groups (121(5), 121(7), 121(8), 121(13), 121(14), 121(15) and 121(16)) are zero value SLFS Luma transfer coefficient groups.

The SLFS Chroma transfer coefficient groups include 4×2 SLFS Chroma transfer coefficients groups 121(17)-121(24), each including four SLFS Chroma transfer coefficients. The eighteenth, twenty third and twenty fourth SLFS transfer coefficient groups (121(18), 121(23) and 121(24)) are non-zero SLFS Chroma transfer coefficient groups while the other SLFS Chroma transfer coefficient groups (121(17), 121(19)-121(22)) are zero value SLFS Chroma transfer coefficient groups.

Assuming that the merger includes adding transform coefficients of different encoded macroblocks that are located at the same location then table 1 illustrates the merge operation that generated TCI(2,1). It is noted that the values that are included in the table are obtained after performing an inverse transform such as Inverse Discrete Fourier Transform.

TABLE 1

| Transform coefficient of TC(1, 1) | Value of transform coefficient | Transform coefficient of TCI(2, 1) | Value of transform coefficient | Transform coefficient of TC(2, 1) | Value of transform coefficient |
|---|---|---|---|---|---|
| 111(1) | A | 421(1) | 0 | 121(1) | A |
| 111(2) | 0 | 421(2) | J | 121(2) | J |
| 111(3) | B | 421(3) | K | 121(3) | B + K |
| 111(4) | 0 | 421(4) | L | 121(4) | L |
| 111(5) | 0 | 421(5) | 0 | 121(5) | 0 |
| 111(6) | C | 421(6) | 0 | 121(6) | C |
| 111(7) | 0 | 421(7) | 0 | 121(7) | 0 |
| 111(8) | 0 | 421(8) | 0 | 121(8) | 0 |
| 111(9) | D | 421(9) | 0 | 121(9) | D |
| 111(10) | E | 421(10) | 0 | 121(10) | E |
| 111(11) | F | 421(11) | 0 | 121(11) | F |
| 111(12) | G | 421(12) | 0 | 121(12) | G |
| 111(13) | 0 | 421(13) | 0 | 121(13) | 0 |
| 111(14) | 0 | 421(14) | 0 | 121(14) | 0 |
| 111(15) | 0 | 421(15) | 0 | 121(15) | 0 |
| 111(16) | 0 | 421(16) | 0 | 121(16) | 0 |
| 111(17) | 0 | 421(17) | 0 | 121(17) | 0 |
| 111(18) | H | 421(18) | 0 | 121(18) | H |
| 111(19) | 0 | 421(19) | 0 | 121(19) | 0 |
| 111(11) | 0 | 421(11) | 0 | 121(11) | 0 |
| 111(21) | 0 | 421(21) | 0 | 121(21) | 0 |
| 111(22) | 0 | 421(22) | 0 | 121(22) | 0 |
| 111(23) | 0 | 421(23) | M | 121(23) | M |
| 111(24) | I | 421(24) | N | 121(24) | I + N |

In the example of FIG. 2, TC(2,1) 121 is represented by two compact data structures—SLFS non-zero indicators I(2,1) 211 and SLFS non-zero data structure NZD(2,1) 321.

I(2,1) 211 indicate which SLFS transfer coefficients groups of TC(2,1) 121 are non-zero. Each set bit of I(2,1) 211 is indicative of a non-zero SLFS transfer coefficient group. FIG. 2 illustrates a bit map that indicates that the first, second, third, fourth, sixth, ninth, tenth, eleventh, twelfth, eighteenth, twenty third and twenty fourth transfer coefficient groups of TC(2,1) 121 are non-zero SLFS transfer coefficient groups while other SLFS transfer coefficient groups of TC(2,1) 121 are zero value SLFS transfer coefficient groups.

NZD(2,1) includes an ordered sequence of non-zero SLFS transfer coefficient groups—121(1), 121(2), 121(3), 121(4), 121(6), 121(9), 121(10), 121(11), 121(12), 121(18), 121(23) and 121(24). It does not include zero value second transfer coefficient groups.

FIG. 2 also illustrates intermediate non-zero indicators II(2,1) 511 that indicate which SLFS intermediate transfer coefficients groups of TCI(2,1) 421 are non-zero SLFS transfer coefficient groups.

The decoder can send I(2,1) 221 and NZD(2,1) 321 to a memory unit. This may occur if these compact data structures have further use—for example if the decoding process requires that one or more additional enhancement layers are decoded. If, for example, the decoding process ends by decoding the second layer than these compact data structures can not be generated or not sent to the memory unit.

Figure 3:
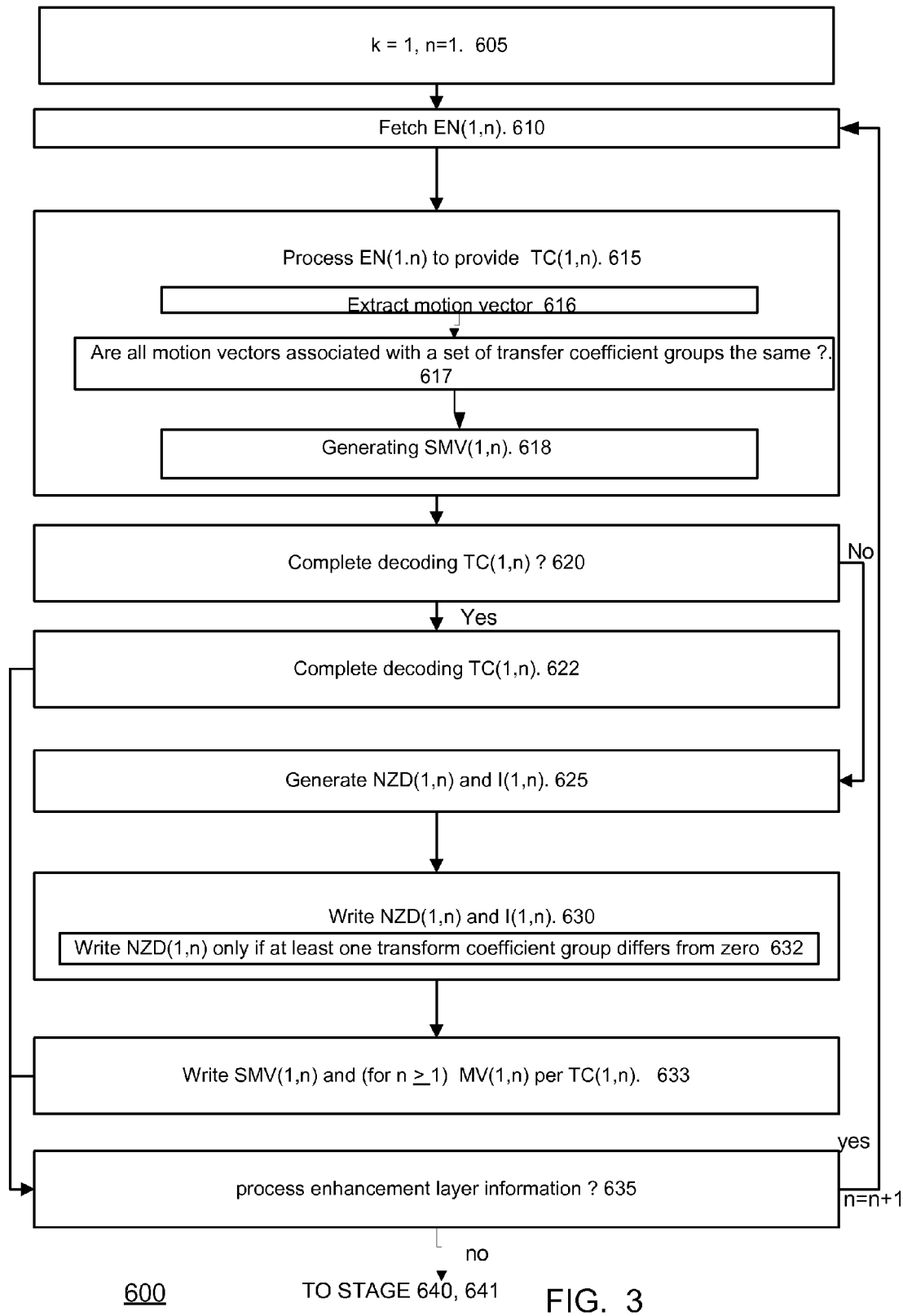
FIGS. 3 and 4 schematically shows an example of an embodiment of a method.

FIGS. 3 and 4 schematically show an example of an embodiment of method 600.

Motion vectors are generated during the encoding process. The encoding process may include generating motion vectors. A motion vector is a two-dimensional vector that is used for inter prediction that provides an offset from the coordinates in the decoded picture to the coordinates in a reference picture. Each set of transfer coefficient group has a motion vector that refers to another (Reference) set of transfer coefficients.

Method 600 may allow a further reduction of the amount of information that is sent to and stored in the memory unit—by reducing the number of motion vectors that are written to the memory unit.

For example, the set of transfer coefficient groups are processed after each other. Thus, if all the motion vectors associated with a set of transfer coefficient groups are the same only a single motion vector can be sent to the memory unit and a single motion vector indicator could be set to indicate that all the motion vectors associated with a set of transfer coefficient groups are the same.

The decoding process may include generating a single motion vector data structure. The single motion data structure may include up to a single motion vector per set of transfer coefficient groups.

The decoding process may also include generating an additional motion vector data structure. The additional motion vector data structure includes the rest of the motion vectors per each set of transfer coefficient group—that are not included in the single motion vector data structure.

Method 600 starts, as shown by stage 605 with setting a layer index k to an initial value such as 1 (k=1) and setting encoded macroblock index n to an initial value such as 1 (n=1). These initial values correspond to the layer and macroblock to be decoded.

Stage 605 is followed by stage 610 of fetching a first layer n'th encoded macroblock from a memory unit. During the decoding process the encoded macroblock is converted to a decoded macroblock. It is noted that in this example the size of the encoded macroblock is assumed not known in advance and stage 610 includes fetching first layer information that is expected to include at least one encoded macroblock. Stage 610 may include fetching a first layer encoded macroblock, a portion of the first layer video stream or the entire first layer video stream. It is assumed, for simplicity of explanation, that during a first iteration of stage 610 only a first layer first encoded macroblock is fetched.

Stage 610 is followed by stage 615 of processing, by a decoder, a first layer n'th encoded macroblock to provide first layer n'th set of transform coefficient groups TC(1,n).

Stage 615 may also include stage 616 of extracting a motion vector per each transform coefficient group, stage 617 of determining if all motion vectors associated with a set of transform coefficient groups are the same an stage 618 of generating, based on the determination of stage 617, a single motion vector indicator (SMV(1,n)) indicating whether all motion vectors associated with TC(1,n) are the same.

Stage 615 is followed by stage 620 of determining whether to complete the decoding process for TC(1,n) (and jump to stage 622) or to continue the decoding process and generate information that will be required when a processing TC(2,n) (and jump to stage 625).

Stage 622 includes completing the decoding process for TC(1,n) and jumping to stage 635.

Stage 625 includes generating a first layer n'th set non-zero data structure NZD(1,n) and first layer n'th set non-zero identifiers I(1,n). NZD(1,n) includes only non-zero first layer n'th set transform coefficient groups and does not include zero value first layer n'th set transform coefficient groups. The first layer n'th set transform coefficient groups are associated with a first quality level. The first layer n'th set non-zero indicators are indicative of non-zero first layer n'th set transform coefficient groups.

Stage 625 is followed by stage 630 of writing to the memory unit NZD(1,n) and I(1,n).

The writing of NZD(1,n) to the memory may be conditioned—NZD(1,n) will be written to the memory unit only if it includes at least one non-zero first layer n'th set transform coefficient group. This is illustrated by stage 632.

Stage 630 also includes stage 633 of writing to the memory unit the single motion vector identifier SMV(1,n) and at least one motion vector (MV(1,n)) per TC(1,n)—according to the determination of stage 617. Stage 631 may include writing up to a single motion vector per TC(1,n) to a single motion vector data structure S and writing multiple motion vectors of TC(1,n)—if such exist—to a multiple motion vector data structure MU. The single motion vector indicator SMV(1,n) indicates whether to fetch a motion vectors from S or MU.

Stage 630 is followed by stage 635 of determining whether to process other subsets of the first layer video stream, increasing n by one (n=n+1) and jumping to stage 610, or to continue the decoding process by processing enhancement layer information and jumping to stage 641.

Stage 635 may be followed by a stage 640 of retrieving, from the memory unit, a k'th layer n'th set non-zero data structure NZD(k,n), a k'th layer n'th set non-zero identifiers I(n,k) and (k+1)'th layer information such as (k+1)'th layer n'th encoded macroblock.

In order to further reduce the transfer of data between layers the retrieval of data from the memory unit the retrieval of NZD(k,n) and, additionally or alternatively of I(n,k) may be conditioned, as illustrated by stages 641-646.

Stages 641-646 are alternative stages to stage 640. For simplicity of explanation, FIG. 4 illustrates both stage 640 and stages 641-646. Stage 640 as well as arrows that are connected to stage 640 are dashed—to illustrate that stage 640 is an alternative to stage s641-646.

Stage 641 includes retrieving IGNORE(k+1) that is indicative of whether to ignore information from previous layers.

Stage 641 is followed by stage 642 of determining, based on the value of IGNORE(k+1) whether to (a) ignore information relating to previous layers (base layer till k'th layer) and jump to stage 643, or (b) not to ignore information relating to previous layers and jump to stage 644.

Stage 643 includes processing EM(k+1,n) regardless of k'th layer information to provide TC(k+1,n). This processing resembles the processing of base layer encoded macroblocks and may include stage 615. Stage 643 is followed by stage 660.

Stage 644 includes fetching EM(k+1,n) and I(k,n).

Stage 644 is followed by stage 645 of determining whether NZD(k,n) is an empty group (all k'th layer n'th set transform coefficient groups are zero). If the answer is positive then NZD(n,k) is not fetched from the memory unit and stage 644 is followed by stage 643.

If NZD(k,n) is not an empty group then stage 645 is followed by stage 646 of fetching NZD(k,n). Stage 646 is followed by stage 650.

Stage 644 may include fetching SMV(1,k) and either one motion vector from S or multiple motion vectors from MU—based on the value of SMV(1,k).

Stage 650 includes processing, by a decoder, the k'th layer n'th set non-zero data structure (NZD(k,n) the k'th layer n'th set non-zero identifiers (I(k,n)) and the (k+1)'th layer n'th encoded macroblock (EM(k+1,n)) to provide (k+1)'th layer n'th set transform coefficient groups TC(k+1,n).

Stage 650 may include stages 651, 652, 653, 654, 655 and 656.

Stage 651 includes processing M(k+1,n) to provide (k+1)'th layer n'th set intermediate transform coefficient groups ITC(k+1,n).

Stage 652 includes reconstructing TC(k,n) from NZD(k,n) and I(k,n).

Stage 653 includes merging TC(k,n) and ITC(k+1,n) to provide TC(k+1,n).

Stage 650 may also include stages 654, 655 and 656.

Stage 654 includes extracting a motion vector per each transform coefficient group.

Stage 655 includes determining if all motion vectors associated with a set of transform coefficient groups are the same.

Stage 656 includes generating, based on the determination of stage 655, a single motion vector indicator (SMV(k+1,n)) indicating whether all motion vectors associated with TC(k+1,n) are the same.

Stage 650 is followed by stage 660 of determining whether to complete the decoding process for TC(k+1,n) (and jump to stage 662) or to continue the decoding process of TC(k+1,n) by processing higher quality layers (and jump to stage 670).

Stage 662 includes completing the decoding process for TC(k+1,n) and jumping to stage 685.

Stage 670 includes generating a (k+1)'th layer n'th set non-zero data structure (NZD(k+1,n)) and (k+1)'th layer n'th set non-zero identifiers (I(k+1,n)). NZD(k+1,n) includes only non-zero (k+1)'th layer n'th set transform coefficient groups and does not include zero value (k+1)'th layer n'th set transform coefficient groups. TC(k+1,n) is associated with a (k+1)'th quality level. I(k+1,n) are indicative of non-zero (k+1)'th layer n'th set transform coefficient groups.

Stage 670 is followed by stage 680 of writing to the memory unit NZD(k+1,n) and I(k+1,n).

The writing of NZD(k+1,n) to the memory may be conditioned—NZD(k+1,n) may be written to the memory unit only if it includes at least one non-zero (k+1)'th layer n'th set transform coefficient group.

Stage 680 may include stage 681 of writing to the memory unit the single motion vector identifier SMV(k,n) and at least one motion vector (MV(k,n)) per TC(k,n)—according to the determination of stage 655. Stage 681 may include writing up to a single motion vector per TC(k,n) to a single motion vector data structure S and writing multiple motion vectors of TC(1,n)—if such exist—to a multiple motion vector data structure MU. The single motion vector indicator SMV(1,n) indicates whether to fetch a motion vectors from S or MU.

Stage 680 is followed by stage 685 of determining whether to process other subsets of the (k+1)'th layer video stream—other encoded macroblocks of the (k+1)'th layer. If the answer is yes stage 685 is followed by increasing n and jumping to stage 641. Else—stage 685 is followed by stage 687 of determining whether to increase the quality of the video stream. If the answer is no then the method ends. Else—stage 687 is followed by stage 688 of increasing k (k=k+1). Stage 688 is followed by stage 640.

Method 600 can process any of the data structures illustrated in FIG. 2. For example, the first non-zero data structure may include an ordered and continuous sequence of non-zero first transform coefficient groups.

Either one of stage 610, 630, 640 and 670 may include executing multiple bursts that have a burst size. A burst may include exchanging multiple bits of information by the data transfer unit. The non-zero transform coefficient groups of each non-zero data structure may be are aligned to burst size. Thus, the burst size may be a multiple integer of the size of a non-zero coefficient group.

A decoding of a certain enhancement layer can be done regardless of information of one or more previous enhancement layers. A "skip previous layer" indicator can be provided and this indicator can indicate to ignore information of a previous enhancement layer. In this case the certain enhancement layer will be processed in the same manner as the first layer. Referring to the example set fourth in FIG. 4—stage 550 will include processing, by a decoder the (k+1)'th layer information to provide (k+1)'th transform coefficient groups.

Method 600 will be further explained using the following assumptions: (a) method 600 is executed one encoded macroblock after the other, (b) all the encoded macroblocks of one layer are processed before processing encoded macroblocks of another layer, (c) the processing includes processing a three layers, each layer includes N macroblocks, (d) method 600 includes stage 640 and not stages 641-646.

TABLE 2

| | |
|---|---|
| 610 | Fetch EM(1, 1), K = 1, n = 1. |
| 615 | Processing EM(1, 1) to provide TC(1, 1), MV(1, 1) and SMV(1, 1) |
| 620 | Determining to continue the decoding |
| 625 | Generating NZD(1, 1) and I(1, 1) |
| 630 | Writing SMV(1, 1), one or more of MV(1, 1), NZD(1, 1) and I(1, 1) to memory unit |
| 635 | Determining to process other encoded macroblocks of the first layer, n = n + 1 |
| 610 | Fetch M(1, 2), K = 1, n = 2. |
| 615 | Processing M(1, 2) to provide TC(1, 2), MV(1, 2) and SMV(1, 2) |
| 620 | Determining to continue the decoding |
| 625 | Generating NZD(1, 2) and I(1, 2) |
| 630 | Writing SMV(1, 2) one or more of MV(1, 2), NZD(1, 2) and I(1, 2) to memory unit |
| 635 | Determining to process other encoded macroblocks of the first layer, n = n + 1 |
| | REPEATING STAGES 610-630 until n = N |
| 640 | Fetch EM(1, N), K = 1, n = N. |
| 650 | Processing M(1, N) to provide TC(1, N), MV(1, N) and SMV(1, N) |
| 660 | Determining to continue the decoding |
| 670 | Generating NZD(1, N) and I(1, N) |
| 680 | Writing SMV(1, N), one or more of MV(1, N), NZD(1, N) and I(1, N) to memory unit |
| 685 | Determining to process other encoded macroblocks of the second layer, |
| 640 | Fetch EM(2, 1), k = 2, n = 1. |
| 650 | Processing M(2, 1) to provide TC(2, 1), MV(2, 1) and SMV(2, 1) |
| 660 | Determining to continue the decoding |
| 670 | Generating NZD(2, 1) and I(2, 1) |
| 680 | Writing SMV(2, 1), one or more of MV(2, 1), NZD(2, 1) and I(2, 1) to memory unit |
| 685 | Determining to process other encoded macroblocks of the first layer, n = n + 1 |
| 640 | Fetch EM(2, 2), k = 2, n = 2. |
| 650 | Processing M(2, 2) to provide TC(2, 2), MV(2, 2) and SMV(2, 2) |
| 660 | Determining to continue the decoding |
| 670 | Generating NZD(2, 2) and I(2, 2) |
| 680 | Writing SMV(2, 2), one or more of MV(2, 2), NZD(2, 2) and I(2, 2) to memory unit |
| 685 | Determining to process other encoded macroblocks of the first layer, n = n + 1 |
| | REPEATING STAGES 610-630 until n = N |
| 640 | Fetch EM(2, N), K = 1, n = N. |
| 650 | Processing M(2, N) to provide TC(2, N), MV(2, N) and SMV(2, N) |
| 660 | Determining to continue the decoding |
| 670 | Generating NZD(2, N) and I(2, N) |
| 680 | Writing SMV(2, N), one or more of MV(2, N), NZD(2, N) and I(2, N) to memory unit |
| 685 | Determining to process other encoded macroblocks of the third layer. |
| 640 | Fetch M(3, 1), K = 3, n = 1. |
| 650 | Processing M(3, 1) to provide TC(3, 1), MV(3, 1) and SMV(3, 1) |
| 660 | Determining to complete the decoding for TC(3, 1) |
| 662 | Completing the decoding process for TC(3, 1) |
| 685 | Determining to process other encoded macroblocks of the third layer, n = n + 1 |
| 640 | Fetch EM(3, 2), k = 3, n = 2. |
| 650 | Processing M(3, 2) to provide TC(3, 2), MV(3, 2) and SMV(3, 2) |
| 660 | Determining to complete the decoding for TC(3, 2) |
| 662 | Completing the decoding process for TC(3, 2) |
| 685 | Determining to process other encoded macroblocks of the third layer, n = n + 1 |
| | REPEATING STAGES 610-635 until n = N |
| 640 | Fetch M(3, N), k = 3, n = N. |
| 650 | Processing M(3, N) to provide TC(3, N), MV(3, N) and SMV(3, N) |
| 660 | Determining to complete the decoding for TC(3, N) |
| 662 | Completing the decoding process for TC(3, N) |

Method 600, as illustrated above, includes a merger process (of TCI(k+1,n) and TC(k,n)) for each fetched encoded macroblock—and for each layer. It is noted that the merger may be executed one per multiple layers and even once per the entire decoding process.

If, for example, a merger is executed once per the entire decoding process then stage 653 will not include said merger, stage 662 will include completing the decoding process for TCI(k+1,n)—whereas the completion may include the merger of TCI(1,n) ... TCI(N,n), and stage 670 will include generating NZD(k+1,n) and I(k+1,n) that represent TCI(k+1,n).

FIG. 5 schematically shows an example of an embodiment of video processing system 800.

Video processing system 800 may include memory unit 810, decoder 820, data transfer unit 830 and controller 840. The controller 840 may manage memory unit 810, decoder 820 and data transfer unit 830 by sending instructions and timing signals to these modules.

The video processing system 600 is illustrated as having an input/output port 890. This port may be connected to a display for displaying a decoded video stream, to a memory unit, may be connected to a RF front end and the like.

The decoder 820 includes: (i) a second transform coefficient groups generator 821 for processing the second layer information and the first non-zero data structure to provide second transform coefficient groups; (ii) a second non-zero data structure generator 822 for generating a second non-zero data structure that comprises only non-zero second transform coefficient groups; and (iii) a second non-zero indicators generator 823 for generating second non-zero indicators that are indicative of non-zero transform coefficient groups.

FIG. 5 illustrates various data structures that can be stored in memory unit 810. For example, these data structure include S 901, MU 902, first layer 10, second layer 20, third layer 30, k'th layer 40 (assuming that k is bigger than three), TC(n,k) 188, I(n,k) 288, NZD(n,k) 388, TCI(n,k) 488, II(n,k) 588, SMV(n,k) 910, IGNORE(k+1) 888, and EMV(n,k) 920.

Video processing system 800 may execute method 600. The following table illustrates stages of method 600 that are executed by each decoder 820, data transfer unit 830 and controller 840. Memory unit 810 stores first layer information, one or more enhancement layer information, multiple non-zero data structures, multiple non-zero identifiers, motion vectors and the like.

It is noted that decoder 820 may execute at least some of the stages that are executed by controller 840.

TABLE 3

| Order of operations | Data transfer unit | decoder | Controller |
| --- | --- | --- | --- |
| 1 | 610 (fetching) | | 610 (Setting k to 1) |
| 2 | | 615 | |
| 3 | | | 620 |
| 4 | | 622 | |
| 5 | | 625 | |
| 6 | | 627 | |
| 7 | | 628 | |
| 8 | 630 | | |
| 9 | | | 635 |
| 10 | 640, 641, 644, 646 | 642, 643, 645 | |
| 11 | | 650 | |
| 12 | | | 660 |
| 13 | | 670 | |
| 14 | | 675 | |
| 15 | 680 | | |
| 16 | | | 685 |
| 17 | | | 688 |

Accordingly, data transfer unit 830 may be configured to: (i) fetch first layer information from a memory unit; (ii) write to the memory unit the first layer n'th set non-zero data structure and the first layer n'th set non-zero identifiers; (iii) write to the memory unit the single motion vector identifier SMV(1,n) and at least one motion vector (MV(1,n)) per TC(1,n)—according to SMV(1,n); (iv) write up to a single motion vector per TC(1,n) to a single motion vector data structure S and write multiple motion vectors of TC(1,n)—if such exist—to a multiple motion vector data structure; (v) retrieve, from the memory unit, a k'th layer n'th set non-zero data structure, a k'th layer n'th set non-zero identifiers and (k+1)'th layer information such as (k+1)'th layer n'th encoded macroblock; (vi) write to the memory unit NZD(k+1,n) and I(k+1,n); (vii) write to the memory unit the single motion vector identifier SMV(k,n) and at least one motion vector (MV(k,n)) per TC(k,n)—according to SMV(k,n); (viii) write up to a single motion vector per TC(k,n) to a single motion vector data structure S; (ix) write multiple motion vectors of TC(k,n)—if such exist—to a multiple motion vector data structure MU; (x) retrieve IGNORE(k+1), (xi) fetch EM(k+1,n) and I(k,n); and (xii) fetch NZD(k,n).

Decoder 820 may also include: (i) first layer processor 820(1) arranged to process a first layer n'th encoded macroblock to provide first layer n'th set of transform coefficient groups TC(1,n); (ii) motion vector extractor 820(2) arranged to extract a motion vector per each transform coefficient group; (iii) decoder controller 820(3) arranged to determine if all motion vectors associated with a set of transform coefficient groups are the same; (iv) single motion vector indicator generator 820(4) arranged to generate, based on the determination a single motion vector indicator (SMV(1,n)) indicating whether all motion vectors associated with TC(1,n) are the same; (iv) decoding process completion module 820(4) arranged to complete the decoding process for TC(1,n); (v) first layer non-zero data structure generator 820(5) arranged to generate a first layer n'th set non-zero data structure NZD (1,1) (vi) first layer non-zero identifier generator 820(6) arranged to generate first layer n'th set non-zero identifiers I(1,1); (vii) transfor coefficient group generator 820(7) arranged to process the k'th layer n'th set non-zero data structure (NZD(k,n) the k'th layer n'th set non-zero identifiers (I(k,n)) and the (k+1)'th layer n'th encoded macroblock (M(k+1,n)) to provide (k+1)'th layer n'th set transform coefficient groups TC(k+1,n); (viii) intermediate set generator 820(8) arranged to process M(k+1,n) to provide (k+1)'th layer n'th set intermediate transform coefficient groups ITC (k+1,n); (ix) reconstruction module 820(9) arranged to reconstruct TC(k,n) from NZD(k,n) and I(k,n); and (xi) merge unit 820(10) arranged to merge TC(k,n) and ITC(k+1,n) to provide TC(k+1,n).

Accordingly, controller 840 may be configured to: (i) set a layer index k to 1 (k=1), set an encoded macroblock index n to 1 (n=1); (ii) determine whether to complete the decoding process for TC(1,n) or to continue the decoding process by processing higher quality layers' (iii) determine whether to process other subsets of the first layer video stream or to continue the decoding process by processing enhancement layer information; (iv) determine whether to process other subsets of the (k+1)'th layer video stream—other encoded macroblocks of the (k+1)' the layer or to continue the decoding process by processing one or more additional enhancement layer information; (v) increase index k (k=k+1).

Video processing system 800 may execute method 600 in a serial manner—one encoded macroblock after the other, and one layer after the other, but may execute method 600 in a pipelined or parallel manner—thus including multiple buffers/registers/calculation units for executing method 600.

It is noted that a fixed memory space may be allocated for each non-zero data structure although a variable length memory space may be allocated per each non-zero data structure. Various data structures (such as S 901, EU 902 and macroblock type information) may be grouped together.

Non-zero data structures and non zero identifiers may be written to a double buffer in which updated data structures may replace older data structures.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. The computer readable medium may be a part of a computer program product. All or some of the computer program may be provided on non-transitory computer readable media permanently, removably or remotely coupled to an information processing system. The non-transitory computer readable media may be included in a computer program product and may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A video processing system, comprising:
   a memory unit for storing data structures that represent transform coefficient groups of layers of macroblocks and for storing layer information associated with quality levels of macroblocks, wherein the transform coefficient groups are transform, coefficient groups of H.264 SVC video protocols;
   a decoder, connected to the memory unit, comprising:
      a non-zero data structure generator for generating non-zero data structures that comprise only non-zero transform coefficient groups of a plurality of the transform coefficient groups, wherein each of the transform coefficient groups contains a plurality of transform coefficients, wherein a non-zero transform coefficient group has at least one non-zero coefficient and wherein a non-zero data structure is obtained from a first plurality of transform coefficient groups by removing transform coefficient groups which do not contain at least one non-zero coefficient from the first plurality of transform coefficient groups, and wherein arrangement of transform coefficients into transform coefficient groups is determined in advance of receipt of the transform coefficient groups by the decoder; and
      a non-zero indicators generator for generating non-zero indicators that are indicative of positions of non-zero transform coefficient groups of the non-zero data structure among the first plurality of transform coefficient groups; and
   a data transfer unit, connected to the memory unit and to the decoder, for transferring the non-zero data structures and layer information to the decoder; and for writing the non-zero indicators and the non-zero data structures to the memory unit, wherein the decoder is for receiving from the memory unit a first non-zero data structure and first non-zero indicators of a first layer macroblock of a first quality level, for reconstructing first transform coefficient groups of the first layer macroblock from the first non-zero data structure and the first non-zero indicators, for receiving from the memory unit second layer information associated with a second quality level higher than the first quality level, for processing the second layer information and the first non-zero data structure to provide second transform coefficient groups, for generating a second non-zero data structure that comprises only non-zero second transform coefficient groups of the second transform coefficient groups, and for generating second non-zero indicators that are indicative of positions of non-zero transform coefficient groups among the first transform coefficient groups and the second transform coefficient groups, wherein the memory unit is to store the second non-zero indicators.

2. The video processing system according to claim 1, wherein the second non-zero data structure comprises an ordered and continuous sequence of non-zero second transform coefficient groups.

3. The video processing system according to claim 1, wherein the data transfer unit is configured to write the second non-zero data structure in multiple bursts that have a burst size; wherein non-zero second transform coefficient groups of the second non-zero data structure are aligned to the burst size.

4. The video processing system according to claim 1, wherein the data transfer unit is configured to write the second non-zero data structure to the memory unit only when the second non zero data structure comprises at least one second non zero transfer coefficient group.

5. The video processing system according to claim 1, wherein the decoder is configured to provide a decoded video stream based on the first and second transfer coefficient groups.

6. The video processing system according to claim 1, configured to process each set out of multiple sets of transfer coefficient groups of a video stream; wherein each set of transfer coefficient groups is associated with multiple motion vectors; and wherein the data transfer unit is configured to write to the memory unit only a single motion vector for a set of transfer coefficient groups if all the motion vectors associated with the set of the transfer coefficient groups are equal to each other.

7. The video processing system according to claim 1, wherein the data transfer unit is further configured to write the second non-zero data structure to the memory unit.

8. The video processing system of claim 1, wherein the non-zero first transform coefficient groups are non-zero transform coefficient groups from a set of transform coefficient groups including a 4×4 set of Luma transform coefficient groups and a 4×2 set of Chroma transform coefficient groups, wherein each of the first transform coefficient groups each consists of 4 transform coefficients.

9. The video processing system of claim 1, wherein the second non-zero indicators are indicative of both non-zero first transform coefficient groups and non-zero second transform coefficient groups.

10. The video processing system of claim 1, wherein:
   first transform coefficient groups comprise first transform coefficient groups of a first layer macroblock;
   the second layer information includes at least one encoded second-layer macroblock corresponding to the location of the first layer macroblock within an image; and
   the second transform coefficient groups comprise second transform coefficient groups of a macroblock with a quality level higher than the first layer quality level, wherein processing the second layer information and the first non-zero data structure includes merging the non-zero first transform coefficient groups and coefficient groups of the second layer information to provide the second transform coefficient groups.

11. A method for processing video, the method comprising:
   receiving first transform coefficient groups of H.264 SVC video protocols by a video decoder, wherein the first transform coefficient groups are transform coefficient groups of a first layer macroblock associated with a first quality level, wherein each of the first transform coefficient groups contains a plurality of coefficients, and wherein arrangement of transform coefficients into transform coefficient groups is determined in advance of the receiving;
   generating by the video decoder a first non-zero data structure that comprises only non-zero first transform coefficient groups of the first transform coefficient groups, wherein each of the transform coefficient groups contains a plurality of transform coefficients, wherein a non-zero transform coefficient group has at least one non-zero coefficient, wherein the first non-zero data structure is obtained from the first transform coefficient groups by removing transform coefficient groups which do not contain at least one non-zero coefficient from the first transform coefficient groups, and wherein arrangement of transform coefficients into transform coefficient groups is determined in advance of receipt of the transform, coefficient groups;

generating by the video decoder first non-zero indicators that are indicative of positions of non-zero transform coefficient groups among the first transform coefficient groups;

writing by the video decoder the first non-zero data structure and the first non-zero indicators to a memory unit;

retrieving, by the video decoder from the memory unit, the first non-zero data structure and the first non-zero indicators;

reconstructing the first transform coefficient groups from the first non-zero data structure and the first non-zero indicators;

receiving second layer information associated with a second quality level higher than the first quality level;

processing the second layer information and the first non-zero data structure to provide second transform coefficient groups;

generating a second non-zero data structure that comprises only non-zero second transform coefficient groups of the second transform coefficient groups;

generating second non-zero indicators that are indicative of positions of non-zero transform coefficient groups among the first transform coefficient the second transform coefficient groups; and storing the second non-zero indicators.

12. The method according to claim 11, comprising:
repeating the stages of retrieving layer information, processing the layer information and non-zero data structures, and generating non-zero indicators for each set out of multiple sets of transform coefficient groups of a video stream; wherein each set of transform coefficient groups is associated with multiple motion vectors; and
writing to the memory unit only a single motion vector per set if all motion vectors associated with the set are equal to each other.

13. The method of claim 11, further comprising:
retrieving, from the memory unit, second layer information associated with a second quality level higher than the first quality level;
processing, by the video decoder, the second layer information and the first non-zero data structure to provide second transform coefficient groups of a macroblock associated with the second quality level;
generating, by the video decoder, a second non-zero data structure that comprises only non-zero second transform coefficient groups;
generating second non-zero indicators that are indicative of positions of non-zero transform coefficient groups among the first transform coefficient groups and the second transform coefficient groups; and
writing to the memory unit the second non-zero indicators.

14. A computer program product that comprises a non-transitory computer readable medium that stores instructions for:
receiving first transform coefficient groups of H.264 SVC video protocols by a video decoder, wherein the first transform coefficient groups are transform coefficient groups of a first layer macroblock associated with a first quality level, wherein each of the first transform coefficient groups contains a plurality of coefficients, and wherein arrangement of transform coefficients into transform coefficient groups is determined in advance of the receiving;

generating by the video decoder a first non-zero data structure that comprises only non-zero first transform coefficient groups of the first transform coefficient groups, wherein each of the transform coefficient groups contains a plurality of transform coefficients, wherein a non-zero transform coefficient group has at least one non-zero coefficient, wherein the first non-zero data structure is obtained from the first transform coefficient groups by removing transform coefficient groups which do not contain at least one non-zero coefficient from the first transform coefficient groups, and wherein arrangement of transform coefficients into transform coefficient groups is determined in advance of receipt of the transform coefficient groups;

generating by the video decoder first non-zero indicators that are indicative of positions of non-zero transform coefficient groups among the first transform coefficient groups;

writing by the video decoder the first non-zero data structure and first non-zero indicators to a memory unit;

retrieving, by the video decoder from the memory unit, the first non-zero data structure and the first non-zero indicators;

reconstructing the first transform coefficient groups from the first non-zero data structure and the first non-zero indicators;

receiving second layer information associated with a second quality level higher than the first quality level;

processing the second layer information and the first non-zero data structure to provide second transform coefficient groups;

generating a second non-zero data structure that comprises only non-zero second transform coefficient groups of the second transform coefficient groups;

generating second non-zero indicators that are indicative of positions of non-zero transform coefficient groups among the first transform coefficient groups and the second transform coefficient groups, wherein the second non-zero data structure is associated with a second quality level that is higher than the first quality level; and storing the second non-zero indicators.

15. The computer program product according to claim 14, wherein the non-transitory computer readable medium stores instructions for generating the second non-zero data structure if a target quality level of the video stream once decoded exceeds the second quality level.

16. The computer program product according to claim 14, wherein the non-transitory computer readable medium stores instructions for:
repeating the stages of retrieving layer information, processing, and generating a non-zero data structure and a non-zero indicator for each set out of multiple sets of transform coefficient groups of a video stream;
writing to the memory unit a first motion vector data structure that comprises up to a single motion vector per set; and
preventing from writing to the memory unit additional motion vectors for a set if all motion vectors associated with the set are equal to each other.

17. The computer program product according to claim 14, wherein the second non-zero indicators form a bit map.

18. The computer program product of claim 17, wherein:
bits of the bit map correspond to transform coefficient groups;
a first bit value of a bit indicates a transform coefficient group corresponding to the bit is a non-zero transform coefficient group; and a second bit value of a bit indicates the transform coefficient group corresponding to the bit is an all zero transform coefficient group.

19. The computer program product of claim 18 wherein the correspondence between the bits and the transform coefficient groups is defined by a scan pattern of the transform coefficient groups whereby the nth bit of the bit map corresponds to the nth transform coefficient group of the transform coefficient groups in an order of the scan pattern.

* * * * *